United States Patent
Ogasawara et al.

(10) Patent No.: US 8,473,969 B2
(45) Date of Patent: Jun. 25, 2013

(54) METHOD AND SYSTEM FOR SPEEDING UP MUTUAL EXCLUSION

(75) Inventors: Takeshi Ogasawara, Tokyo (JP); Akira Koseki, Kanagawa-ken (JP); Hideaki Komatsu, Kanagawa-ken (JP); Kiyokuni Kawachiya, Kanagawa-ken (JP); Tamiya Onodera, Saitama-ken (JP)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 12/173,551

(22) Filed: Jul. 15, 2008

(65) Prior Publication Data

US 2008/0276256 A1 Nov. 6, 2008

Related U.S. Application Data

(63) Continuation of application No. 10/952,142, filed on Sep. 28, 2004, now abandoned.

(51) Int. Cl.
*G06F 9/44* (2006.01)
*G06F 9/46* (2006.01)

(52) U.S. Cl.
USPC .................. 719/320; 718/100; 718/104

(58) Field of Classification Search
USPC ...... 718/1, 101, 102, 104, 107, 100; 719/320; 710/200, 240; 711/150, 152
See application file for complete search history.

(56) References Cited

U.S. PATENT DOCUMENTS

| | | | |
|---|---|---|---|
| 6,173,442 B1 * | 1/2001 | Agesen et al. | 717/141 |
| 6,772,153 B1 * | 8/2004 | Bacon et al. | 1/1 |
| 7,209,918 B2 * | 4/2007 | Li | 1/1 |
| 7,814,488 B1 * | 10/2010 | Dice et al. | 718/103 |
| 2001/0014905 A1 * | 8/2001 | Onodera | 709/102 |
| 2004/0054861 A1 * | 3/2004 | Harres | 711/163 |
| 2004/0205313 A1 * | 10/2004 | Hudson et al. | 711/163 |

OTHER PUBLICATIONS

Kawachiya et al., "Lock Reservation: JAVA Locks Can Mostly Do Without Atomic Operations," Nov. 4-8, 2002, pp. 130-141.
Lamport, "A Fast Mutual Exclusion Algorithm," Nov. 14, 1985, pp. 1-15.

* cited by examiner

*Primary Examiner* — Emerson Puente
*Assistant Examiner* — Willy W Huaracha
(74) *Attorney, Agent, or Firm* — Lieberman & Brandsdorfer, LLC

(57) ABSTRACT

In a multiprocessor computer system, a lock operation is maintained with a thread using non-atomic instructions. Identifiers are assigned to each thread. Flags in conjunction with the thread identifiers are used to determine the continuity of the lock with a thread. However, in the event continuity of the lock with the thread ceases, a compare-and-swap operation is executed to reset the lock with the same thread or another thread. Similarly, in the event there has been a collision between two or more threads requesting the lock, a compare-and-swap operation is executed to assign the lock to one of the requesting threads. Accordingly, prolonged ownership of a lock operation by a thread is encouraged to mitigate use of atomic operations in granting of the lock to a non-owning thread.

9 Claims, 3 Drawing Sheets

METHOD AND SYSTEM FOR SPEEDING UP MUTUAL EXCLUSION

CROSS REFERENCE TO RELATED APPLICATION(S)

The present application is a continuation of U.S. patent application Ser. No. 10/952,142 filed on Sep. 28, 2004, now abandoned, which is hereby incorporated by reference.

BACKGROUND OF THE INVENTION

1. Technical Field

This invention relates to a method and system for assigning a lock to a thread in a multiprocessing computer system requesting exclusive access to a shared resource. More specifically, execution of non-atomic operations is utilized to extend lock ownership to a thread repeatedly requesting the lock.

2. Description of the Prior Art

Multiprocessor systems contain multiple processors (also referred to herein as CPUs) that can execute multiple processes or multiple threads within a single process simultaneously in a manner known as parallel computing. In general, multiprocessor systems execute multiple processes or threads faster than conventional single processor systems, such as personal computer, that execute programs sequentially. The actual performance advantage is a function of a number of factors, including the degree to which parts of a multithreaded process and/or multiple distinct processes can be executed in parallel and the architecture of the particular multiprocessor system. The degree to which processes can be executed in parallel depends, in part, on the extent to which they compete for exclusive access to shared memory resources.

Shared memory multiprocessor systems offer a common physical memory address space that all processors can access. Multiple processes therein, or multiple threads within a process, can communicate through shared variables in memory which allow the processes to read or write to the same memory location in the computer system. Message passing multiprocessor systems, in contrast to shared memory systems, have a separate memory space for each processor. They require processes to communicate through explicit messages to each other. The architecture of shared memory multiprocessor systems may be classified by how memory is physically organized. In distributed shared memory (DSM) machines, the memory is divided into modules physically placed near one or more processors, typically on a processor node. Although all of the memory modules are globally accessible, a processor can access local memory on its node faster than remote memory on other nodes. Because the memory access time differs based on memory locations, such systems are also called non-uniform memory access (NUMA) machines. In centralized shared memory machines, the memory is physically in one location. Centralized shared memory computers are called uniform memory access (UMA) machines because the memory is equidistant in time from each of the processors. Both forms of memory organization typically use high-speed cache in conjunction with main memory to reduce execution time.

The use of NUMA architecture to increase performance is not restricted to NUMA machines. A subset of processors in a UMA machine may share a cache. In such an arrangement, even though the memory is equidistant from all processors, data can circulate among the cache-sharing processors faster (i.e., with lower latency) than among the other processors in the machine. Algorithms that enhance the performance of NUMA machines can be applied to any multiprocessor system that has a subset of processors with lower latencies. These include not only the noted NUMA and shared cache machines, but also machines where multiple processors share a set of bus-interface logic as well as machines with interconnects that "fan out" (typically in hierarchical fashion) to the processors.

A significant issue in the design of multiprocessor systems is process synchronization. The degree to which processes can be executed in parallel depends in part on the extent to which they compete for exclusive access to shared memory resources. For example, if two processes A and B are executing in parallel, process B might have to wait for process A to write a value to a buffer before process B can access it. Otherwise, a race condition could occur, where process B might access the buffer while process A was part way through updating the buffer. To avoid conflicts, process synchronization mechanisms are provided to control the order of process execution. These mechanisms include mutual exclusion locks, condition variables, counting semaphores, and reader-writer locks. A mutual exclusion lock allows only the processor holding the lock to execute an associated action. When a processor requests a mutual exclusion lock, it is granted to that processor exclusively. Other processors desiring the lock must wait until the processor with the lock releases it. To address the buffer scenario described above, both processes would request the mutual exclusion lock before executing further. Whichever process first acquires the lock, updates (in the case of process A) or accesses (in the case of process B) the buffer. The other processor must wait until the first processor finishes and releases the lock. In this way, the lock guarantees that process B sees consistent information, even if processors running in parallel execute processes A and B.

Mutual exclusion locks are granted through the use of atomic operations, which utilize system resources and degrade performance. Locks may be requested for shared and non-shared subjects alike. Depending upon the operation executing on the processor, the frequency of lock requests may vary. During an extended lock ownership, every lock operation does not stall a processor, and instructions not related to each lock can be executed without undergoing negative impact of an operation that uses an atomic operation to grant a lock to a requesting thread. Accordingly, there is a need for an algorithm that improves system performance through non-atomic operations in limited circumstances.

SUMMARY OF THE INVENTION

This invention comprises a method and system for managing ownership of a lock in a multithreaded computer system.

In one aspect of the invention, a method is provided for managing a multithreaded computer system. A determination if ownership of a lock by a first thread has been discontinued is made through comparison of thread identifiers. A first thread identifier is compared to a second thread identifier, and a flag is set in response to the comparison. Ownership of the lock is assigned to a requesting thread by executing a compare-and-swap operation if it has been determined that ownership of the lock by a prior owning thread has been discontinued.

In another aspect of the invention, a computer system is provided with a processor and two or more threads to execute a process. A lock manager is provided in communication with the processor. The lock manager determines discontinuity of ownership of a lock by a first thread. A thread manager is provided in communication with the lock manager to compare identifiers of threads to determine discontinuity, and a flag is set by the thread manager in response to the comparison of thread identifiers. The lock manager assigns ownership of the lock to a requesting thread by execution of a compare-and-swap operation in response to a determination of discontinuation of ownership of the lock by a prior owning thread.

In yet another aspect of the invention, an article is provided having a computer-readable data storage medium. Instructions in the medium are provided for determining discontinuity of lock ownership by a first thread. The instructions compare a thread identifier of the first thread with a thread identifier of a second thread. A flag is set in response to the comparison. In addition, instructions in the medium are provided for assigning ownership of the lock to a requesting thread by executing a compare-and-swap operation if it has been determined that ownership of the lock by the prior owning thread has been discontinued.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

In a multiprocessing computer system having shared objects, locks are granted to threads requesting exclusive access to one or more of the shared objects. Java program perform many lock operations while supporting thread locality. To mitigate use of atomic operations associated with granting of the lock to the requesting thread, continuity of the lock with a previously granted thread may be maintained with non-atomic operations. Atomic operations are implemented on a limited basis to either reset ownership or to assign a lock to a requesting thread in the event continuity of the lock with the thread is interrupted.

Technical Details

Figure 1:
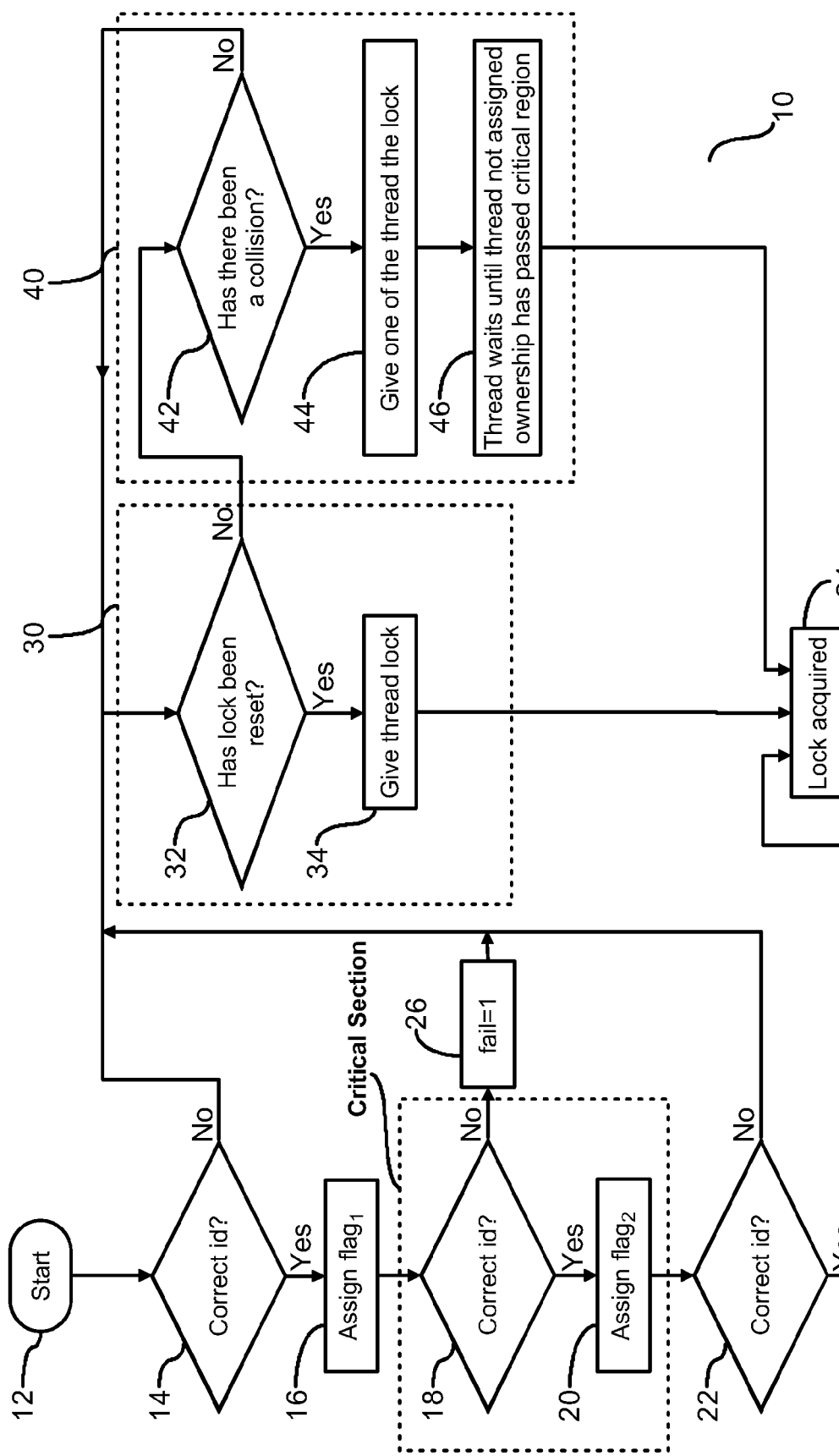
FIG. 1 is a flow chart illustrating a process for maintaining lock ownership with a thread according to the preferred embodiment of this invention, and is suggested for printing on the first page of the issued patent.

FIG. 1 is a flow chart (10) illustrating a process for efficiently managing ownership of a lock by a thread in a multithreaded computer system. Each thread in the system is assigned an identification number. Initially an instruction of a thread is loaded and a first set of tests is conducted to determine if ownership of a lock may be held by a thread for an extended period. The following tests and instructions are implemented with simple instructions, i.e. non-atomic instructions, of load, compare, and store. In the first step following loading of the instruction at step (12), a thread identifier of the owner of the last thread to own the lock is loaded and compared to the thread identifier associated with the instruction at step (12) to determine if the identifiers of the thread of the instruction matches the identifier of the last thread to own the lock (14). A positive response to the test at step (14) will result in setting a first flag (16) to show that ownership of the lock has been verified to belong to the last thread to own the lock and to prevent a change in ownership of the lock. However, since the operation at step (16) is a non-atomic instruction, it is possible that a change in ownership of the lock can occur between the initial verification of ownership at step (14) and setting of the first flag at step (16). As such, a second of test is conducted to confirm ownership of the lock prior to maintaining ownership of the lock with the requesting thread. A second test includes loading the thread identifier of the owner of the last thread to own the lock and comparing this thread identifier with the thread identifier of the thread associated with the instruction at step (12) to determine if the identifier of the thread of the instruction matches the identifier of the thread owning the lock (18). A positive response to the test at step (18) will result in setting a second flag (20) to show that ownership of the lock has been verified. Finally, a third test includes loading the thread identifier of the owner of the last thread to own the lock and comparing this thread identifier with the thread identifier of the thread associated with the instruction at step (12) to determine if the identifier of the thread of the instruction continues to match the identifier of the thread owning the lock (22). A positive response to the test at step (22) will result in the thread queried at steps (14), (18), and (22) acquiring the lock (24), or in this case retaining ownership of the lock. The process outlined in steps (14)-(22) is executed with non-atomic operations efficiently. In a case of a high frequency of repeated lock ownership by a specific thread owner, locality is established. However, since these operations are implemented only with non-atomic instructions, it is possible that the querying processor thread may be denied ownership of the lock by another thread acquiring ownership at any time prior to actual acquisition of the lock by the querying thread. Accordingly, confirmation of ownership is performed at two subsequent steps (18) and (22) to ensure that the lock ownership has not changed.

A positive response to each of the test at steps (14), (18), and (22) will result in the inquiring thread retaining ownership of the lock. However, a negative response to the test at steps (14) or (18) is an indication that lock ownership may have changed. Similarly, a negative response to the test at step (18) is an indication that there has been a collision between two threads requesting the lock. If it is determined at step (18) that there has been a collision between two threads trying to acquire one lock, a collision flag is set (26). Following the negative response to the test at steps (14) or (22), or setting of the collision flag at step (26), an initial compare and swap operation (30) is initiated to determine if the lock has been reset, i.e. the lock is not acquired by any thread. The compare-and-swap operating is comprised of two essential steps that allow a processor or thread to automatically test and modify a memory location. The first step in the first compare and swap operation (30) is a test to determine if the two flags identified at steps (16) and (20) have been cleared (32). A positive response to the test at step (32) will result in an atomic operation assigning the lock to the thread executing the compare-and-swap operation (34), i.e. acquisition of the lock by the thread executing the compare-and-swap operation. Accordingly, the initial compare and swap operation is executed if it is determined that ownership of the lock has been reset, and is so assignment of the lock to the thread executing the compare-and-swap operation.

If the initial compare-and-swap operation (30) fails, this is an indication that ownership of the lock has not been cleared. A second compare-and-swap operation (40) is then initiated by one of the threads to reset ownership of the lock following a collision between two threads competing for the same lock. The first step in the second compare-and-swap operation (40) is a test to determine if there has been a collision between two or more threads (42), i.e. if the flag at step (26) has been set. A negative response to the first step (42) will result in a return to the first compare-and-swap operation (30). However, a positive response to the test at step (42) will result in an atomic operation to assign the lock to the thread executing the compare and swap operation (44). Following the assignment at step (44), the thread assigned ownership of the lock in the second compare-and-swap operation (40) waits until the thread that was not assigned ownership of the lock has passed the critical section (46), i.e. one or more instructions, before the thread assigned ownership of the lock acquires the lock (24). The implementation of the critical section is set to prevent handing off of the lock and setting of associated flags, which would result in another collision between threads. Accordingly, the second compare-and-swap operation is used to reset ownership of a lock to a requesting thread following a collision between two or more threads.

Figure 2A:
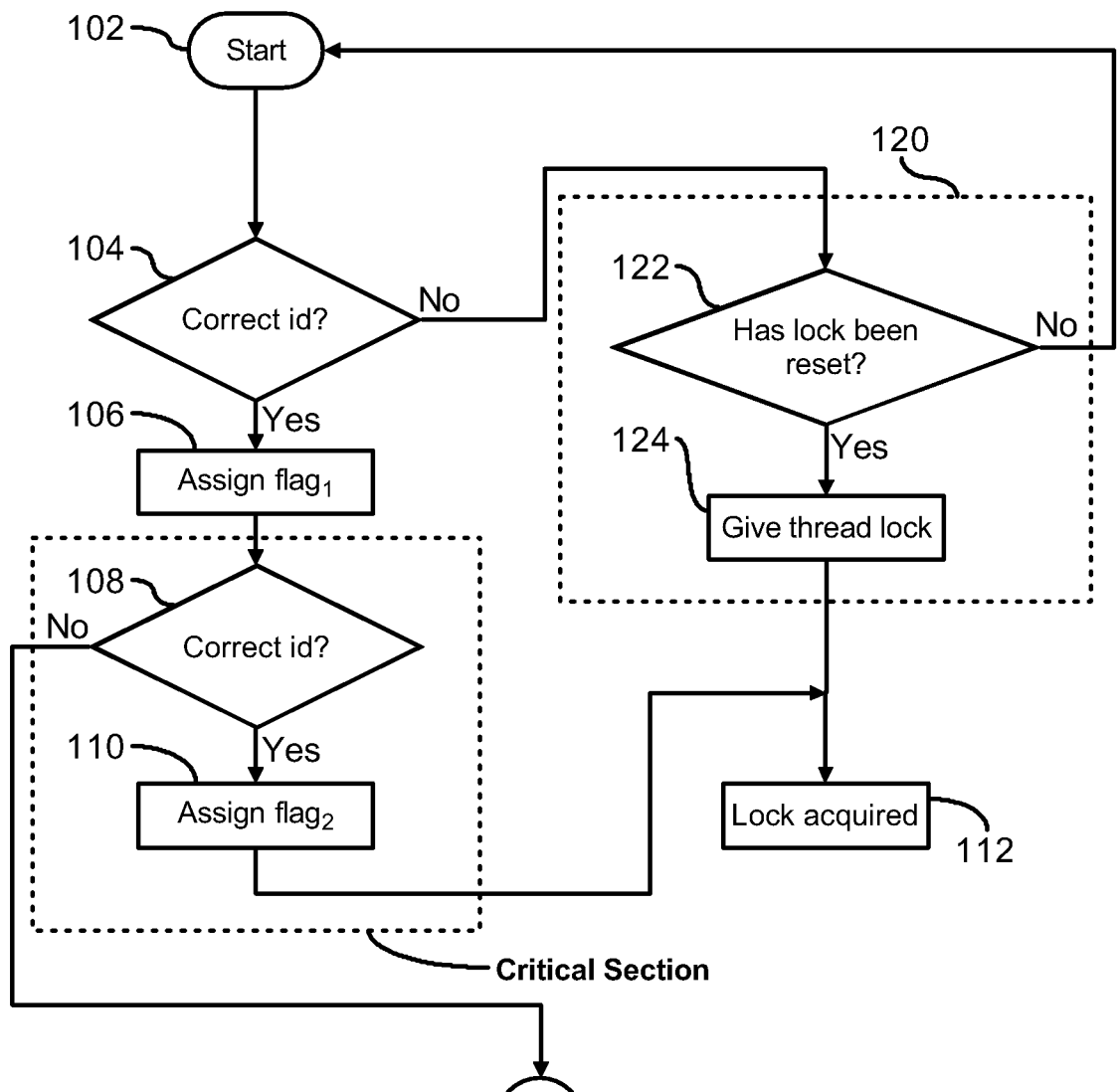
FIGS. 2a and 2b are flow charts illustrating an alternative process for maintaining lock ownership with a thread.

FIG. 2a is a flow chart (100) illustrating an alternate process for efficiently managing ownership of a lock by a thread in a multithreaded computer system. Initially an instruction of a thread is loaded (102) and a first set of tests is conducted to determine if ownership of a lock may be held by a thread for an extended period. The following tests and instructions are implemented with simple instructions, i.e. non-atomic, of load, compare, and store. In the first step following loading of the instruction at step (102), the thread identifier of the owner of the last thread to own the lock is loaded and compared to the thread identifier associated with the instruction at step (102) to determine if the identifier of the thread of the instruction matches the identifier of the last thread to own the lock (104). A positive response to the test at step (104) will result in setting a first flag (106) for the lock to show that ownership of the lock has been verified to belong to the last thread to own the lock and to prevent a change in ownership of the lock. However, since the first flag setting operation at step (106) is a non-atomic instruction, it is possible that a change in ownership of the lock can occur between the initial verification of ownership at step (104) and setting of the first flag at step (106). As such, a second test is conducted to confirm ownership of the lock prior to maintaining ownership of the lock with the thread (108). The second test (108) includes loading the thread identifier of the owner of the last thread to own the lock and comparing this thread identifier with the thread identifier associated with instruction at step (102) to determine if the identifier of the thread of the instruction matches the identifier of the thread owning the lock. A positive response to the test at step (108) will result in setting a second flag (110) for the lock to show that ownership of the lock has been verified. The thread queried at steps (104) and (108) acquires the lock (112), or in this case retains ownership of the lock. When the thread retains lock ownership, both the first and second flags of the lock are set. The process outlined in steps (104)-(110) is executed with non-atomic operations efficiently with a high frequency in which owner locality is established. However, since these operations are implemented with non-atomic instructions, it is possible that the querying processor thread may be denied ownership of the lock by another thread requesting ownership of the lock during the period between the verification of ownership at steps (104) or (108) and setting of the respective flag for the lock at steps (106) or (110). Accordingly, confirmation of ownership is performed with only two queries and without a collision flag to ensure that the lock ownership has not changed prior to a thread acquiring the lock.

A positive response to each of the tests (104) and (108) will result in the inquiring thread retaining ownership of the lock. However, a negative response to either the test at step (104) or at (108) is an indication that lock ownership may have changed. If the response to the test at step (104) is negative, a first initial compare-and-swap operation (120) is initiated to determine if the lock has been reset, i.e. the lock is not acquired by any thread. The first step in the first compare-and-swap operation (120) is a test to determine if the two flags associated with thread ownership are cleared (122). A positive response to the test at step (122) is an indication that no thread currently owns the lock as the two flags function as indicators of lock ownership. An atomic modification to the memory location identifying ownership of the lock and assigning ownership of the lock to the thread executing the compare-and-swap operation is conducted (124), followed by acquisition of the lock (112) by the thread initiating the compare-and-swap operation (120). The process of assigning the lock to the thread includes setting a bit in each of two flags to indicate lock ownership. However, if the compare-and-swap operation (120) at steps (122) and (124) fails, this is an indication that the lock as not been reset and the process returns to step (102). Accordingly, the initial compare-and-swap operation is executed and succeeds if it is determined that ownership of the lock has been reset.

Figure 2B:
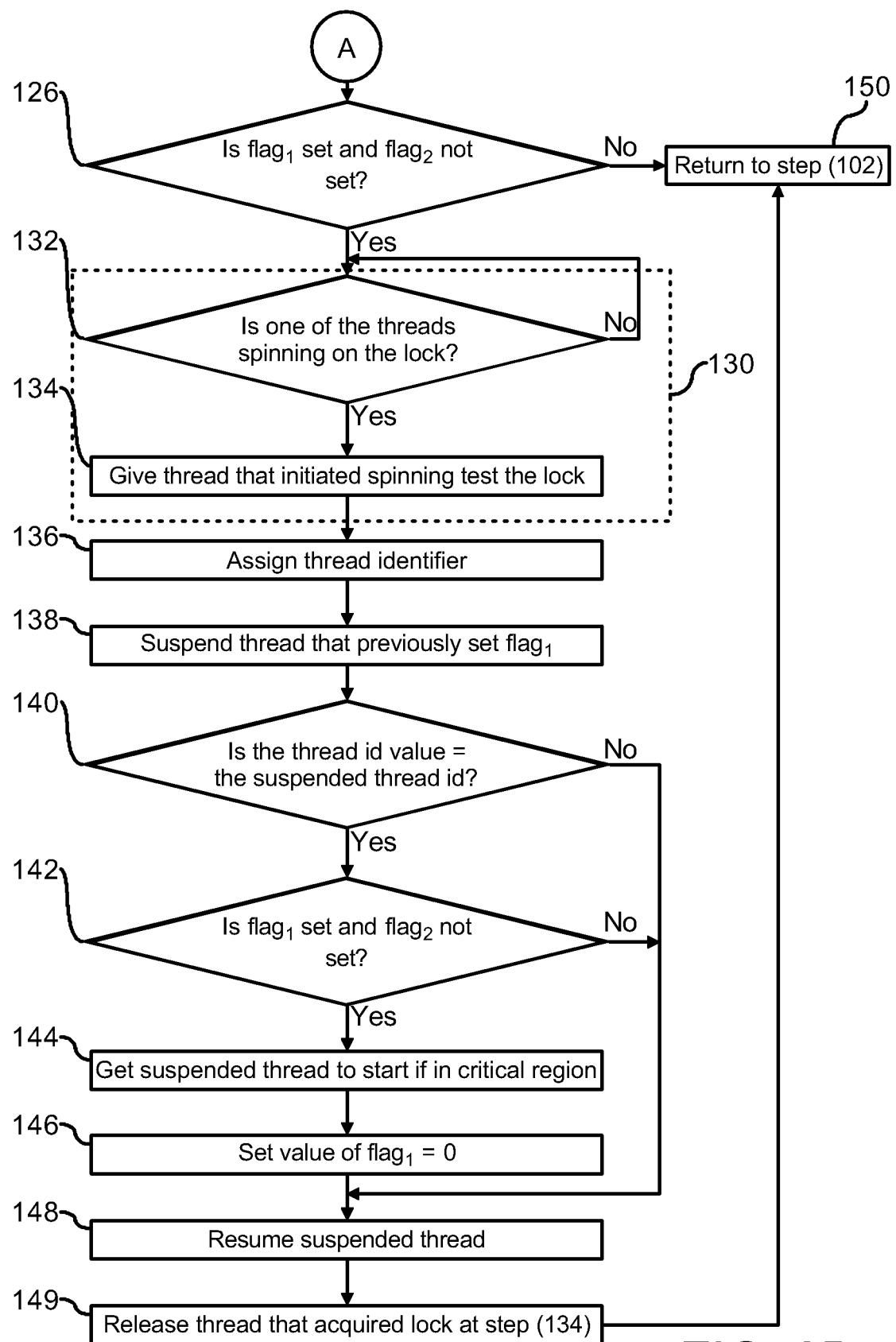

If the second thread identifier comparison test at step (108) fails, this is an indication that ownership of the lock may have changed following the first comparison at step (104). As shown in FIG. 2b, a test is conducted to determine if the first flag for the lock is set, as assigned at step (106), and the second flag for the lock is not set (126). If the response to the test at step (126) is negative, the process proceeds to step (150) to return to step (102). However, if the response to the test at step (126) is positive, a second compare-and-swap operation (130) is then initiated by one of the threads to clear the first flag and to enable the lock to be reset. The lock can only be reset by resetting the values in each of the two flags. The purpose of clearing the first flag set at step (106) is to avoid a situation in which no threads can acquire the lock because the thread owning the lock has abandoned the efficient ownership confirmation path shown at steps (104)-(110).

The compare-and-swap operation (130) supports the thread that originally owned the lock at step (102) performing a spin lock to ensure that a single thread resets the lock. The first step in the compare-and-swap operation (130) is to determine if one of the threads is spinning on the lock (132). A negative response to the test at step (132) will result in a return to the first step (132) in the compare-and-swap operation (130). However, a positive response to the test at step (132) will result in assigning the lock to the thread that initiated the compare-and-swap operation (134) to enable this thread to clear the flag set at step (106), i.e. reset lock ownership. The thread assigned the lock at step (134) maintains the thread identifier (136). Thereafter, the thread holding the lock suspends the thread that had previously set the first flag on the lock (138). The holding process enables the thread holding the lock to examine which code of the program the now suspended thread executed. A test is then conducted to determine if the value of the thread identifier of the thread holding the lock has changed to the value of the identifier of the suspended thread (140). If it is determined at step (140) that the value of the thread identifier is still the same value as the identifier of the suspended thread, a subsequent test is conducted to determine if the first flag of the lock is set and the second flag of the lock is cleared (142). A negative response to the test at step (142) will result in resuming the suspended thread (148). Similarly, a negative response to the test at step (140) will result in resuming the suspended thread (148). However, a positive response to the test at step (142) is an indication that the suspended thread is either performing this algorithm or was the last thread to perform this algorithm for the target lock. If the suspended thread is performing this algorithm and is executing in the critical region, the thread granted the lock at step (134) modifies the execution context of the suspended thread so that the suspended thread can restart the algorithm (144). Thereafter, the value of the first flag of the lock is cleared (146), and the suspended thread resumes operation (148). The thread that acquired the lock at step (134) releases the lock (149), followed by a return (150) to step (102). Similarly, a negative response to the test at step (140) is followed by a release of the lock (149) by the thread that acquired the lock at step (134), and return (150) to step (102). Accordingly, the thread that interfered with extended ownership of the lock at another thread is placed in a suspended state in order to properly reset ownership of the lock.

Advantages Over the Prior Art

The purpose of the algorithms shown herein is to construct an efficient method for maintaining local ownership of a lock by a thread with simple instructions. Memory requirements are significantly reduced compared to a fast mutual exclusion technique. For example, the only memory required is the two bits associated with the first and second flags and the thread identifiers. In addition, the use of atomic operations is kept to a minimum by encouraging the use of non-atomic operations to maintain lock ownership. Atomic operations are implemented in the event of a collision between two or more threads requesting a lock, or a reset of a lock. Accordingly, system resource is efficiently utilized in the event of extended lock ownership by a thread.

Alternative Embodiments

It will be appreciated that, although specific embodiments of the invention have been described herein for purposes of illustration, various modifications may be made without departing from the spirit and scope of the invention. In particular, other algorithms may be implemented to assign lock ownership to a requesting thread in the event of a collision between two or more threads requesting the lock or a reset of the lock by an intervening thread. Additionally, alternative indicators may be used in place of the multiple flags to set lock ownership. The invention may be applied to Java programs, or any other programs supporting multithreaded environments. Accordingly, the scope of protection of this invention is limited only by the following claims and their equivalents.

We claim:

1. A method for managing a multithreaded computer system comprising:
a second thread requesting ownership of a lock for a shared memory resource owned by a first thread;
determining discontinuity of lock ownership by the first thread, including a first comparison of a thread identifier of the first thread with a thread identifier of the second thread, and setting a first flag in response to a determination of discontinuity of lock ownership;
extending continuity of lock ownership and setting a second flag in response to confirmation of continuity of said lock operation by the first thread; and
assigning ownership of the lock to the second thread by executing a first compare-and-swap operation in response to a determination that ownership of the lock by the first thread has been discontinued, including waiting until a thread denied lock ownership has passed a critical section prior to assigning ownership to the second thread, wherein a second compare-and-swap operation is initiated responsive to a changed lock ownership following the first comparison, but prior to setting a second flag, to clear the first flag and enable a lock reset.

2. The method of claim 1, further comprising detecting collision of execution of the lock operation by two or more threads in response to a determination of discontinuity of a lock operation by the first thread.

3. The method of claim 2, further comprising resetting lock ownership with a compare-and-swap operation in response to the collision.

4. A computer system comprising:
a processor with two or more threads to execute a process, a second thread requesting ownership of a lock for a shared memory resource owned by a first thread;
a lock manager in communication with the processor to determine discontinuity of ownership of a lock by the first thread;
a thread manager in communication with the lock manager for a first comparison to compare identifiers of the first and second threads to determine discontinuity of lock ownership;
the thread manager adapted to set a first flag in response to a determination of discontinuity of lock ownership;
the thread manager adapted to extend continuity of lock ownership and to set a second flag in response to confirmation of continuity of said lock operation by the first thread; and
the lock manager adapted to assign ownership of the lock to the second thread by execution of a first compare-and-swap operation in response to a determination of discontinuation of ownership of the lock by the first thread, including waiting until a thread denied lock ownership has passed a critical section prior to assigning ownership to the second thread, wherein a second compare-and-swap operation is initiated responsive to a changed lock ownership following the first comparison, but prior to setting a second flag, to clear the first flat and enable a lock reset.

5. The system of claim 4, further comprising the thread manager to detect collision of execution of a lock operation by two or more threads in response to a determination of discontinuity of a lock operation by the first thread.

6. The system of claim 5, further comprising the compare-and-swap operation to reset lock ownership to a requesting thread in response to detection of a collision by the thread manager.

7. An article comprising:
a non-transitory computer-readable data storage medium tangibly embodying instructions including:
instructions in the medium for a second thread requesting ownership of a lock for a shared memory resource owned by a first thread;
instructions in the medium for determining discontinuity of lock ownership by the first thread, including a first comparison of a thread identifier of the first thread with a thread identifier of the second thread;
instructions in the medium for setting a first flag in response to a determination of discontinuity of lock ownership;
instructions in the medium for extending continuity of lock ownership and setting a second flag in response to confirmation of continuity of said lock operation by the first thread; and
instructions in the medium for assigning ownership of the lock to the second thread by executing a compare-andswap operation in response to a determination that the ownership of the lock by the first thread has been discontinued, including waiting until a thread denied lock ownership has passed a critical section prior to assigning ownership to the second thread, wherein a second compare-and-swap operation is initiated responsive to a changed lock ownership following the first comparison, but prior to setting a second flag, to clear the first flag and enable a lock reset.

8. The article of claim 7 further comprising instructions in the medium for detecting collision of execution of the lock operation by two or more threads in response to a determination of discontinuity of a lock operation by the first thread.

9. The article of claim 8, further comprising instructions in the medium for resetting lock ownership with a compare-and-swap operation in response to the collision.

* * * * *